(12) United States Patent
Harms et al.

(10) Patent No.: US 8,686,581 B2
(45) Date of Patent: Apr. 1, 2014

(54) METHOD FOR OPERATING A WIND TURBINE IN THE EVENT OF THE OCCURRENCE OF A GRID FAULT WITH A VOLTAGE DROP AND SUCH A WIND TURBINE

(75) Inventors: Ulrich Harms, Hamburg (DE); Malte Laubrock, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 10 days.

(21) Appl. No.: 13/589,480

(22) Filed: Aug. 20, 2012

(65) Prior Publication Data

US 2013/0043845 A1    Feb. 21, 2013

(30) Foreign Application Priority Data

Aug. 20, 2011 (DE) .......................... 10 2011 111 210

(51) Int. Cl.
*F03D 9/00* (2006.01)
*H02P 9/04* (2006.01)
*H02P 9/10* (2006.01)
*H02P 9/14* (2006.01)

(52) U.S. Cl.
USPC .................................. 290/44; 290/55; 322/59

(58) Field of Classification Search
USPC ........................................ 290/44, 55; 322/59
See application file for complete search history.

(56) References Cited

U.S. PATENT DOCUMENTS

| 6,512,966 | B2* | 1/2003 | Lof et al. ....................... 700/291 |
| 6,921,985 | B2 | 7/2005 | Janssen et al. .................. 290/44 |
| 7,569,944 | B2* | 8/2009 | Oohara et al. ................... 290/44 |
| 7,714,458 | B2 | 5/2010 | Harms et al. .................... 290/44 |
| 7,834,472 | B2 | 11/2010 | Rebsdorf et al. ................ 290/44 |
| 7,851,934 | B2 | 12/2010 | Nyborg ........................... 290/44 |
| 7,966,103 | B2 | 6/2011 | Joergensen et al. ........... 700/297 |
| 8,067,845 | B2 | 11/2011 | Thulke et al. ................... 290/44 |
| 8,093,740 | B2* | 1/2012 | Oohara et al. ................... 290/44 |
| 8,203,318 | B2 | 6/2012 | Fortmann ...................... 323/207 |
| 8,278,773 | B2* | 10/2012 | Murata ........................... 290/44 |
| 2002/0084655 | A1* | 7/2002 | Lof et al. ........................ 290/44 |
| 2003/0006613 | A1* | 1/2003 | Lof et al. ........................ 290/44 |
| 2005/0127680 | A1* | 6/2005 | Lof et al. ........................ 290/44 |
| 2008/0277938 | A1* | 11/2008 | Oohara et al. ................... 290/44 |
| 2009/0261589 | A1* | 10/2009 | Oohara et al. ................... 290/44 |
| 2010/0207589 | A1 | 8/2010 | Heier .............................. 322/59 |

FOREIGN PATENT DOCUMENTS

DE    10 2009 027 981 A1    1/2011

* cited by examiner

*Primary Examiner* — Pedro J Cuevas
(74) *Attorney, Agent, or Firm* — Walter Ottesen P.A.

(57) ABSTRACT

A method for operating a wind turbine when a grid fault with a voltage drop occurs. The turbine has a rotor with a rotor blade having an adjustable blade pitch angle, a generator connected to the rotor for generating power for a power grid and a converter connected to the generator and the power grid. The grid fault is identified and a present value of a turbine variable representing a power is detected and a hold setpoint for the variable representing a power of the turbine is preset. A maximum and/or minimum permissible setpoint for the variable of the turbine is determined. The setpoint is increased or reduced once the hold time has elapsed. The turbine is driven with a setpoint preset which corresponds to the rotational speed. A presetting of the maximum permissible setpoint is ended when the rotational speed-dependent setpoint is lower than the maximum permissible setpoint.

28 Claims, 8 Drawing Sheets

METHOD FOR OPERATING A WIND TURBINE IN THE EVENT OF THE OCCURRENCE OF A GRID FAULT WITH A VOLTAGE DROP AND SUCH A WIND TURBINE

CROSS REFERENCE TO RELATED APPLICATION

This application claims priority of German patent application no. 10 2011 111 210.7, filed Aug. 20, 2011, the entire content of which is incorporated herein by reference.

FIELD OF THE INVENTION

The present invention relates to a method for operating a wind turbine in the event of the occurrence of a grid fault with a voltage drop, wherein the wind turbine has a rotor with at least one rotor blade with an adjustable blade pitch angle, a generator, which is connected to the rotor, for generating an electrical power for an electrical power supply grid and a converter, which is connected to the generator and the electrical power supply grid. In addition, the invention relates to such a wind turbine having a converter and a generator.

BACKGROUND OF THE INVENTION

United States patent application publication 2010/0207589 discloses a method for operating a double-fed asynchronous generator, in which the stator is connected to a power supply grid. The rotor is operated via the drive train of the wind turbine. The rotor is electrically coupled to the power supply grid via a machine-side and a grid-side converter. In the event of the identification of short-circuit currents in the power supply grid, the present actual value of the machine-side rotor current is detected, frozen and used instead of the selected setpoints for the control of the machine-side rotor current.

U.S. Pat. No. 7,966,103 discloses a wind turbine and a method for operating the wind turbine in the event of grid faults with a low voltage. The known method envisages controlling the output current depending on a power stored in the system during a grid fault with a low voltage. The blade pitch angle is kept constant during the voltage drop.

U.S. Pat. No. 7,851,934 discloses a method for the control of a wind turbine, in which one or more rotor blades are driven in a fault mode in the event of a grid fault in order to keep the rotor speed stable within a predetermined range.

U.S. Pat. No. 7,834,472 discloses a method for the control of a wind turbine during faulty operation in the electrical power supply grid, in which one or more rotor blades of the wind turbine are driven during the grid fault in order to keep the temperature in the stator and/or rotor of the generator below a predetermined maximum temperature.

U.S. Pat. No. 7,714,458 discloses a method for operating a wind turbine, in which a blade pitch angle for the rotor blade is set depending on a rotational speed. By providing a new blade pitch angle, the wind turbine can be set to a new stable operating point without being isolated from the power supply grid for rapid load reduction.

U.S. Pat. No. 6,921,985 B2 discloses a method for the control of a wind turbine, in which a grid fault is identified and control of the blade pitch angle is performed in response to the grid fault, wherein the adjustment system of the blade pitch angle is fed by an uninterruptable power supply during the grid fault.

In general, the situation in the case of a wind turbine is such that the wind turbine cannot output the maximum power in the event of unexpected grid faults. The resultant quick dip in power of the wind turbine first results in an increase in rotational speed and, once the grid fault has come to an end, in a temporary rotational speed undershoot. In the event of a grid fault, the grid voltage decreases for a time of several seconds to such an extent that the output electrical active power of the wind turbine also reduces correspondingly, under some circumstances down to 0 kW. The reduced load on the drive train results in an increase in rotational speed. The rotational speed controller then compensates for the increased speed in the case of conventional wind turbines. As a result of the control loop dynamics, a rotational speed undershoot can then occur. The initially increased rotational speed subjects the wind turbine to a load and can also be problematic for a converter of the wind turbine.

In the case of grid faults with voltage dips, the power drop has the effect that the wind turbine can only output a reduced power to the grid and stores the excess power, by virtue of an increase in the rotational speed, in the rotor of the wind turbine. After the grid fault, a higher power is then demanded by the power controller, owing to the higher rotational speed, than is actually present in the wind. The rotational speed thus decreases again. The energy stored in the rotor is output to the grid within a short period of time which is not desirable from the point of view of the grid operators.

In the event of grid faults during nominal load operation of the wind turbine, said wind turbine operates at the nominal speed and control of the rotational speed and the power is performed by virtue of adjusting the blade pitch angle. It is not possible for any energy to be stored in the rotor since a control for the blade pitch angle causes the rotational speed of the rotor to return to the nominal rotational speed. After the grid fault has ended, when the output power is stepped up again, the rotational speed experiences a dip to values below the nominal rotational speed. The power controller then reduces the setpoint preset for the power in accordance with its rotational torque/speed curve in order to transfer the installation to a stable operating point. At the same time, the blade pitch controller responds and attempts to bring the rotational speed back to the nominal rotational speed by means of adjusting the blade pitch angle. Once the grid fault has been cleared, therefore, there is a power dip for a short period of time which should be avoided in respect of the stability of the electrical power supply grid.

SUMMARY OF THE INVENTION

The invention is based on the object of providing a method for operating a wind turbine and such a wind turbine which make it possible, using simple means to bring the wind turbine back to a stable operating point once a grid fault has been cleared.

The method for operating a wind turbine according to the invention is intended, in the event of the occurrence of a grid fault with a voltage drop, to bring the wind turbine back to a stable operating point once the grid fault has been cleared. The wind turbine has a rotor with at least one rotor blade with an adjustable blade pitch angle. In addition, the wind turbine has a generator, which is connected to the rotor, for generating an electrical power for an electrical power supply grid and a converter, which is connected to the generator and the electrical power supply grid. The method according to the invention has the method step of identifying a grid fault. In addition, a present value for a variable representing a power is detected. Furthermore, presetting of a hold setpoint for the variable representing a power of the wind turbine during a hold time is performed, wherein the hold setpoint corresponds to the present value of the variable representing a power when the grid fault arises. The method according to the invention also envisages determining a maximum permissible setpoint for the variable representing a power of the wind turbine, wherein the maximum permissible setpoint is increased with time once the hold time has elapsed. The wind turbine is driven in accordance with a setpoint preset, which corresponds to the present rotational speed of the wind turbine, wherein the setpoint preset is limited to the maximum permissible setpoint. The method according to the invention ends the selection of a maximum permissible setpoint as soon as the rotational speed-dependent setpoint is lower than the maximum permissible setpoint, after which the wind turbine is driven in accordance with the rotational speed-dependent setpoint. The method according to the invention therefore ends, once the hold time has elapsed, when the setpoint, determined in a rotational speed-dependent manner, of the wind turbine is below the maximum permissible setpoint. In the method according to the invention, therefore, a setpoint preset for the wind turbine within the hold time is frozen and then limited as soon as the wind turbine is driven by a setpoint preset depending on the rotational speed. In order to again achieve a stable operating point once the hold time has come to an end, the setpoint of the wind turbine is then restricted and slowly released with time. As soon as the rotational speed-dependent setpoint is below the maximum permissible setpoint, the wind turbine has again reached a stable operating point. In addition, in the method according to the invention, additional energy which is possibly stored in the rotor is not outputted in a short period of time and is not outputted suddenly to the electrical power supply grid, but owing to the increase of the maximum permissible setpoint a delayed output of the stored power to the electrical power supply grid takes place.

The method according to invention can likewise be implemented using a minimum permissible setpoint for the variable representing a power. In this case, the minimum permissible setpoint is determined and reduced with time once the hold time has elapsed. The setpoint limitation then takes place in such a way that the setpoint preset corresponding to the present rotational speed is limited to the minimum permissible setpoint. The method according to the invention ends as soon as the rotational speed-dependent setpoint is greater than the minimum permissible setpoint.

Provision is likewise made in accordance with the invention to implement a method in which both a minimum permissible setpoint for the variable representing a power and a maximum permissible setpoint for the variable representing a power are determined. In this case, the maximum and minimum permissible setpoint defines a permissible setpoint range within which the rotational speed-dependent setpoint preset for driving the wind turbine falls.

In a preferred embodiment of the method according to the invention, the identification of a grid fault is performed depending on one or more of the following variables: change in a grid voltage, changes in a grid frequency, a fault message from the converter and a fault message from the generator. Insofar as this is geared to a change in an electrical variable, a threshold value range can preferably be defined, with the result that, when the change in the electrical variable is outside the permissible tolerance range, a grid fault is identified. In the method according to the invention, the electrical variables for identification of the grid fault can be measured at the wind turbine or at the point of common coupling of the wind turbine into the electrical power supply grid. Alternatively, it is also possible for these electrical variables to be measured at another point in the electrical power supply grid and passed onto the wind turbine for the identification of the grid fault.

In a preferred embodiment, the variable representing a power is an actual value or setpoint of an electrical power to be generated. It is also possible for the variable representing the power to be geared to an actual value or setpoint of a generator torque. It is also possible to link the two variables to one another in order to obtain a variable which is suitable for the method according to the invention.

In a preferred embodiment, control of the blade pitch angle takes place during the hold time in order to set a rotational speed corresponding to the hold setpoint. This feature attempts, by virtue of adjusting the blade pitch angle during the occurrence of the grid fault, to operate the wind turbine at a rotational speed which corresponds to the frozen hold setpoint. Once the hold time has come to an end, this makes it easier to reach a stable operating point.

In a preferred embodiment of the method according to the invention, an increase in the maximum permissible setpoint is performed at a predetermined first rate of change. The minimum permissible setpoint is preferably reduced at a predetermined second rate of change. First and second rates of change can be selected so as to be equal in magnitude.

The method according to the invention also envisages that the hold time is brought to an end when the rotational speed falls below a predetermined minimum value for the rotational speed. This is intended to prevent the rotational speed falling too severely during the hold time in order to reach a stable operating point again once the grid fault has been cleared.

In a preferred embodiment, the value of the minimum permissible setpoint is equal to that of the maximum permissible setpoint. In the event of an increase in the maximum permissible setpoint and a reduction in the minimum permissible setpoint, this results in a setpoint range which begins with a smallest range width when the hold time elapses and increases in size with time.

The object of the present invention is likewise achieved by a wind turbine according to the invention. The wind turbine according to the invention has a rotor with at least one rotor blade with an adjustable blade pitch angle, a generator, which is connected to the rotor, for generating an electrical power for an electrical power supply grid and a converter, which is connected to the rotor and the electrical power supply grid. The wind turbine according to the invention has a grid fault identification device, which identifies a grid fault in the electrical power supply grid. In addition, the wind turbine according to the invention is equipped with a control, which presets a present value for a variable representing a power, as hold setpoint, for the converter and/or the generator during the hold time in response to an identified grid fault. The control also presets a rotational speed-dependent setpoint for the converter and/or the generator once the hold time has elapsed. The wind turbine according to the invention also has a setpoint limitation device, which, once the hold time has elapsed, limits the preset setpoint to a maximum permissible setpoint and increases the maximum permissible setpoint with time. The setpoint limitation device ensures that when, once the hold time has elapsed, a rotational speed-dependent setpoint of the wind turbine is preset for driving purposes, the value of said setpoint is limited to the maximum permissible setpoint.

According to the invention, the object is also achieved by a wind turbine according to the invention. This wind turbine likewise has a rotor with at least one rotor blade with an adjustable blade pitch angle, a generator, which is connected to the rotor, for generating an electrical power for an electrical power supply grid and a converter, which is connected to the generator and the electrical power supply grid. The wind turbine has a grid fault identification device, which identifies a grid fault in the electrical power supply grid. A control presets a present value for a variable representing a power, as hold setpoint, for the converter and/or the generator during a hold time in response to an identified grid fault. Once the hold time has elapsed, the control presets a rotational speed-dependent setpoint for the converter and/or the generator. The wind turbine according to the invention has a setpoint limitation device, which, once the hold time has elapsed, limits the preset setpoint to a minimum permissible setpoint and reduces the minimum permissible setpoint with time. This setpoint limitation device ensures that, once the hold time has elapsed, when a rotational speed-dependent setpoint is preset for the wind turbine for driving purposes, said setpoint is not lower than the minimum permissible setpoint. By virtue of the reduction in the minimum permissible setpoint, the wind turbine is brought back to a stable operating point.

In addition to the configuration in which the setpoint limitation device determines a maximum permissible setpoint and increases this setpoint with time and the configuration in which the setpoint limitation device has a minimum permissible setpoint and reduces this setpoint with time, the invention also provides a wind turbine which has a setpoint limitation device which has both a maximum permissible setpoint and a minimum permissible setpoint and, once the hold time has elapsed, limits a setpoint preset by the control in such a way that said setpoint is in the range between the minimum permissible setpoint and the maximum permissible setpoint. In this configuration, once the hold time has elapsed, the range is increased with time.

The wind turbine according to the invention is also equipped with a blade pitch control, which controls, by means of open-loop or closed-loop control, a blade pitch angle of a rotor blade in response to a grid fault in order to achieve a rotational speed corresponding to the hold setpoint. The hold setpoint relates to a present value for a variable representing a power, with the result that this variable corresponds to the hold setpoint of a rotational speed. Thus, in this configuration, even during the occurrence of the grid fault when the hold setpoint is preset for the control of the wind turbine, setting of the blade pitch angle corresponding to a rotational speed of the rotor in accordance with the hold setpoint is performed.

In a preferred configuration, the setpoint limitation device reduces the minimum permissible setpoint with time to zero. Likewise, the setpoint limitation device can increase the maximum permissible setpoint with time to the nominal power of the wind turbine or a fixed value above the nominal power.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
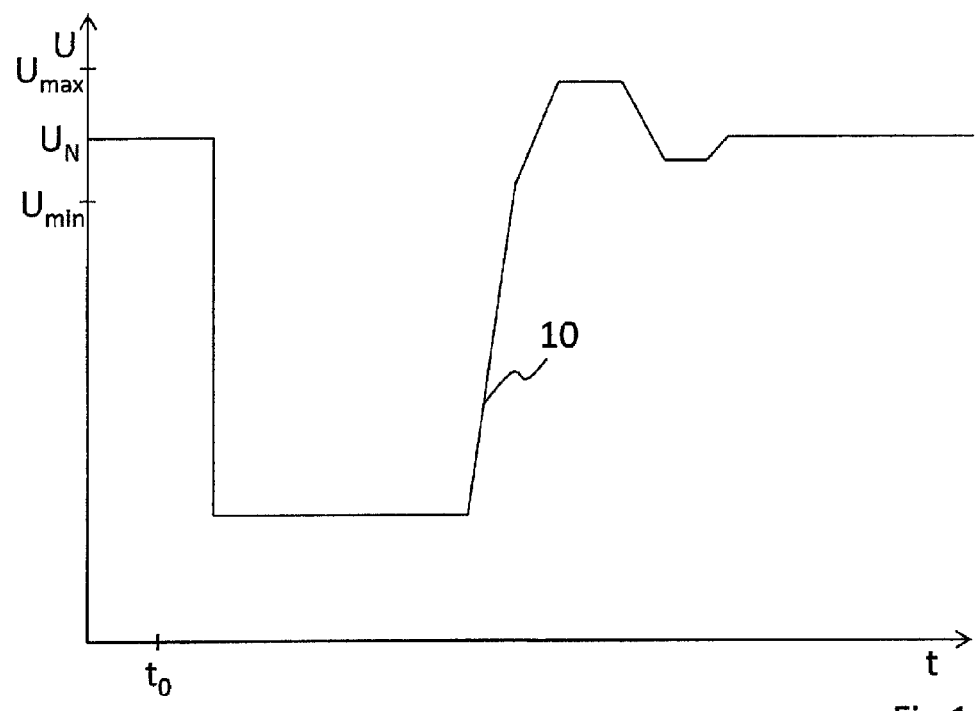
FIG. 1 shows the profile of the grid voltage over time with a time indicator prior to the occurrence of the grid fault.

FIG. 1 shows a profile 10 of the grid voltage U over time t. The grid voltage U may be a resultant rms value of the three-phase grid voltage or the grid voltage in a single phase. At time $t_0$, the nominal voltage with the value $U_N$ is present in the grid. For clarification purposes, FIG. 1 also shows values for the maximum voltage $U_{max}$ and minimum voltage $U_{min}$. These values are used to define the occurrence of a grid fault in the event of the voltage limits being undershot or overshot.

Figure 2:
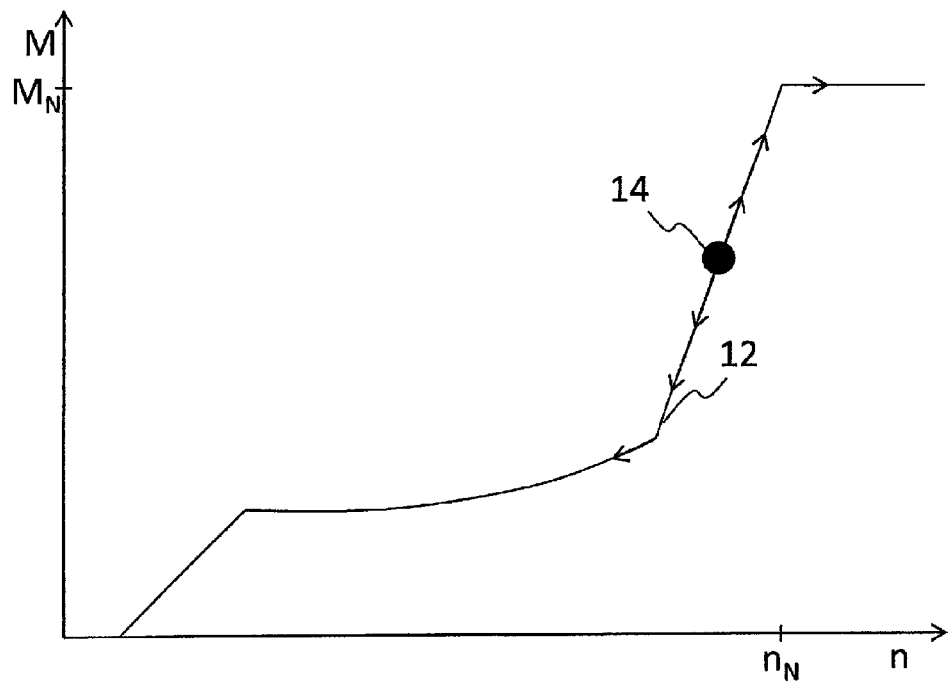
FIG. 2 shows the generator torque over the rotational speed with the present operating point of the wind turbine, prior to the occurrence of the grid fault.

FIG. 2 shows a characteristic curve known per se for the control of the generator torque M as a function of the rotational speed n. The characteristic curve 12 prescribes a setpoint for the generator torque to be set for control of a wind turbine depending on the rotational speed. The product of the rotational speed n and the generator torque M corresponds to the setpoint for the power $P_S$ to be generated or fed. The use of a rotational speed-dependent setpoint for the generator torque facilitates the illustration of the invention and clarifies the basic physical relationships between the electrical power, mechanical power and rotational speed. In the control of the wind turbine, the setpoint for the generator torque is converted automatically into a setpoint for the power to be generated since the driven converter always has an electrical power as output variable.

At the present operating point 14, the installation is in the partial load range, in which the nominal value for the generator torque $M_N$ has not yet been reached. This operating state of the wind turbine is present at time $t_0$, as indicated in FIG. 1. The operating point 14 is on a steeply rising branch of the characteristic curve of the wind turbine, in which the generator torque generated increases severely directly prior to the nominal speed $n_N$ being reached.

Figure 3:
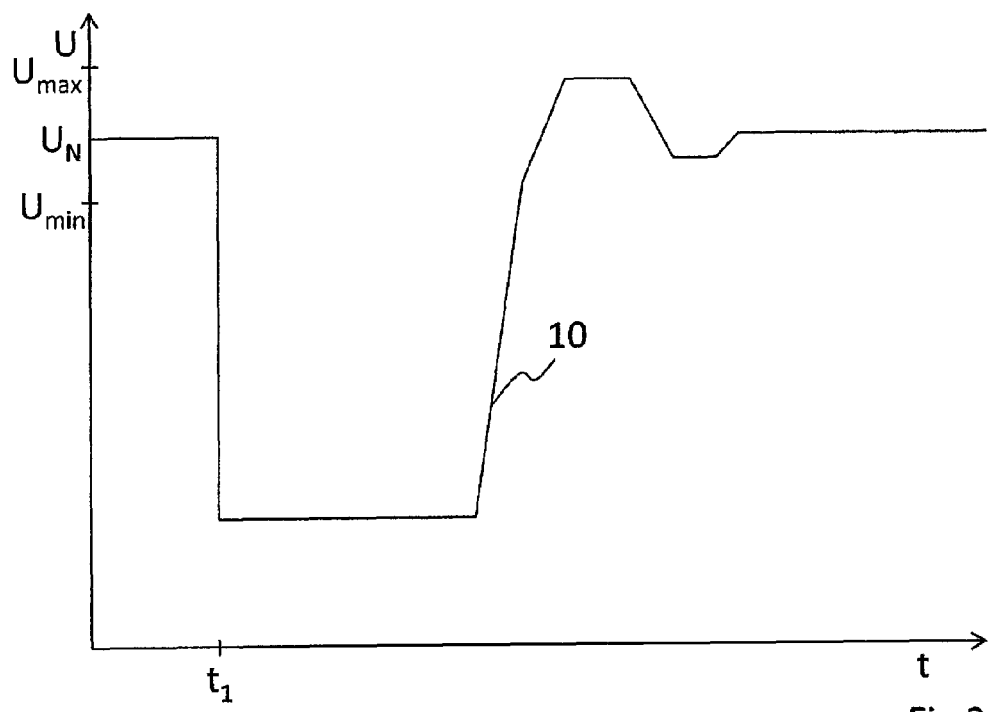
FIG. 3 shows the voltage-time profile shown in FIG. 1 with a time indicator as the grid fault occurs.

FIG. 3 shows the voltage-time profile 10 shown in FIG. 1 with a time indicator when the voltage fault occurs at time $t_1$.

Figure 4:
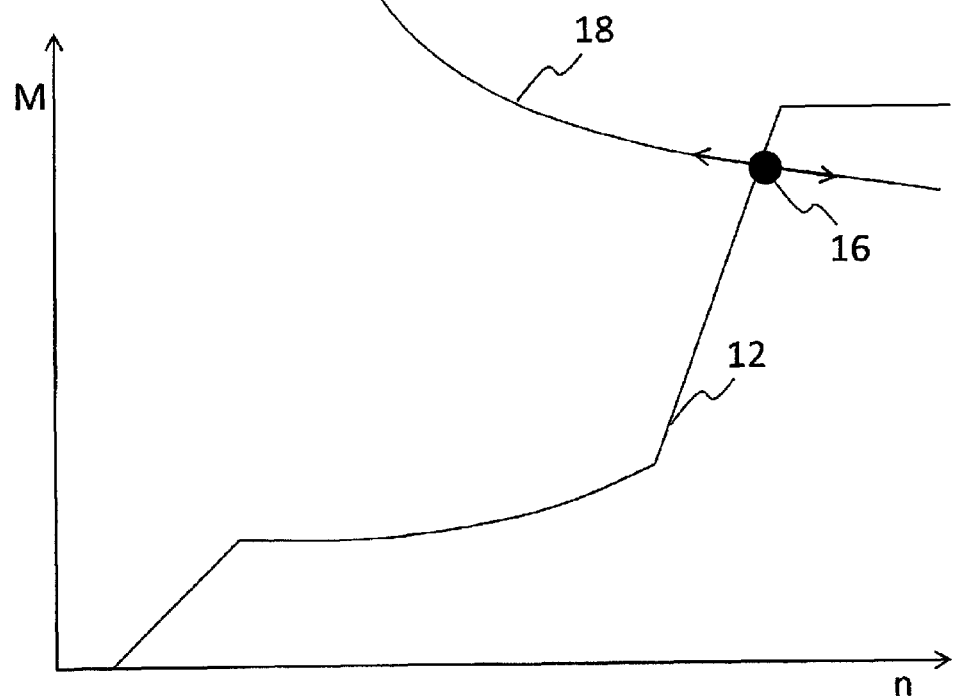
FIG. 4 shows the generator torque depending on the rotational speed with the present operating point of the wind turbine as the grid fault occurs.

FIG. 4 shows the characteristic curve 12 shown in FIG. 2 for the generator torque as a function of the rotational speed, wherein the operating point 16 for the wind turbine is present. In the method according to the invention, when the grid fault occurs, that is, at time $t_1$ indicated in FIG. 3 or directly thereafter, the setpoint for the electrical power is frozen for the hold time. Owing to the abovementioned relationship between the electrical power, the rotational speed and the torque, it follows, given a fixed power, that the setpoint for the generator torque is inversely proportional to the rotational speed. This results in the characteristic curve 18 in FIG. 4 which runs through the operating point 16 and describes those operating points of the wind turbine in which the setpoint which results from the product of the generator torque and the rotational speed corresponds to a constant power. If, at the time of the grid fault, another operating point were to be present than the operating point 16 illustrated in FIG. 4, the characteristic curve 18 would correspondingly pass through this operating point with a constant power.

Figure 5:
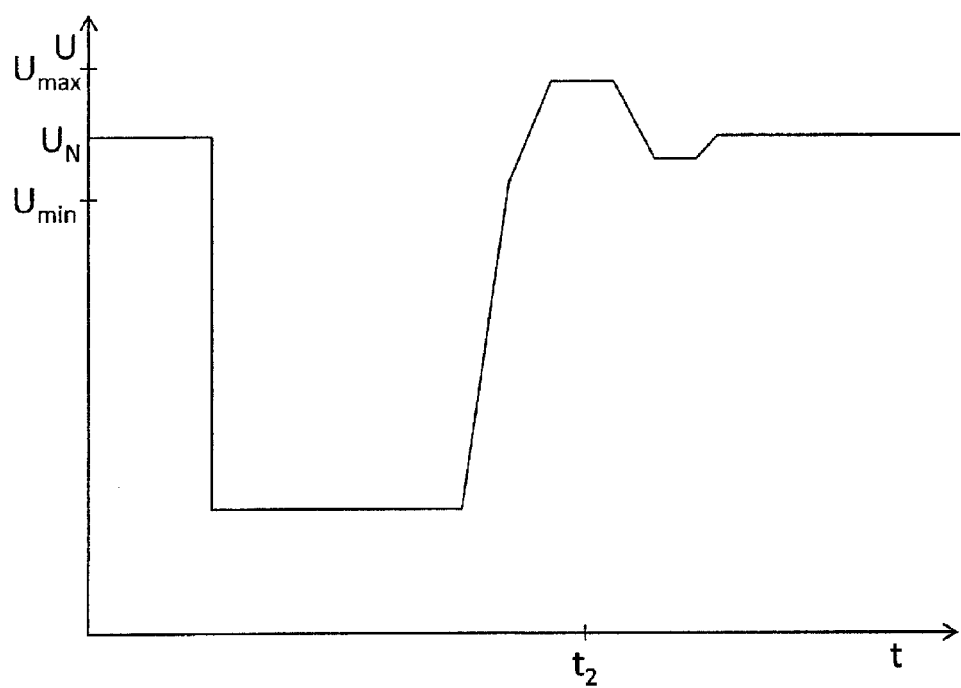
FIG. 5 shows the voltage-time profile shown in FIG. 1 with a time indicator for a time after the grid fault has been cleared.

FIG. 5 shows the voltage-time characteristic curve 10 shown in FIG. 1 with an indication of the consideration time $t_2$. At time $t_2$, the grid voltage U has already returned, that is, the grid fault has been cleared. Correspondingly, the grid voltage is also again within the range between $U_{min}$ and $U_{max}$.

Figure 6:
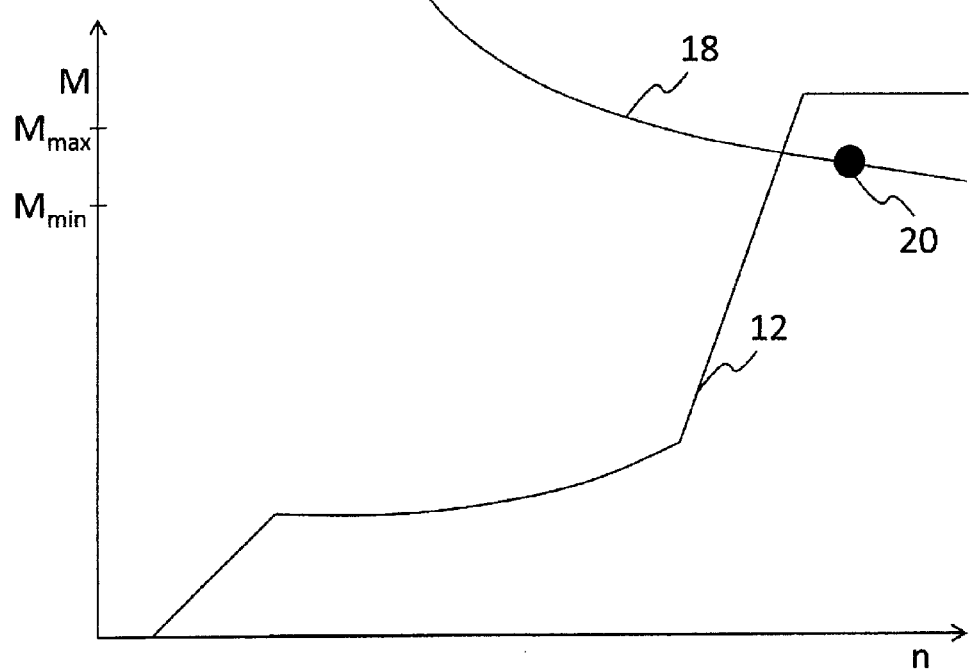
FIG. 6 shows the generator torque over the rotational speed with the present operating point of the wind turbine after the grid fault has been cleared.

FIG. 6 shows the operating point 20 of the wind turbine on the characteristic curve 18 at time $t_2$, indicated in FIG. 5. In order to return the wind turbine to a stable operating point after a grid fault with a voltage dip, it is necessary to shift the operating point 20 back onto the characteristic curve 12. In the example illustrated in FIG. 6, the actual rotational speed value is greater than the setpoint rotational speed predetermined by the characteristic curve 12. In order to return the operating point 20 to the characteristic curve 12, the setpoint for the generator torque is increased and thus the rotational speed is automatically reduced until the operating point 20 is back on the characteristic curve 12 and therefore the setpoint for the generator torque is again preset in a rotational speed-dependent manner. The return of the operating point 20 to the characteristic curve 12 is limited by a maximum generator torque $M_{max}$ and a minimum generator torque $M_{min}$. In the event of an increase in the setpoint for the generator torque, care should be taken to ensure that said setpoint does not overshoot the value $M_{max}$ and does not undershoot the value $M_{min}$. In FIG. 6, the setpoint preset for the generator torque can be increased up to the value $M_{max}$ in which case a settable rate of change for the increase in the maximum permissible setpoint $M_{max}$ is then preset.

Figure 11:
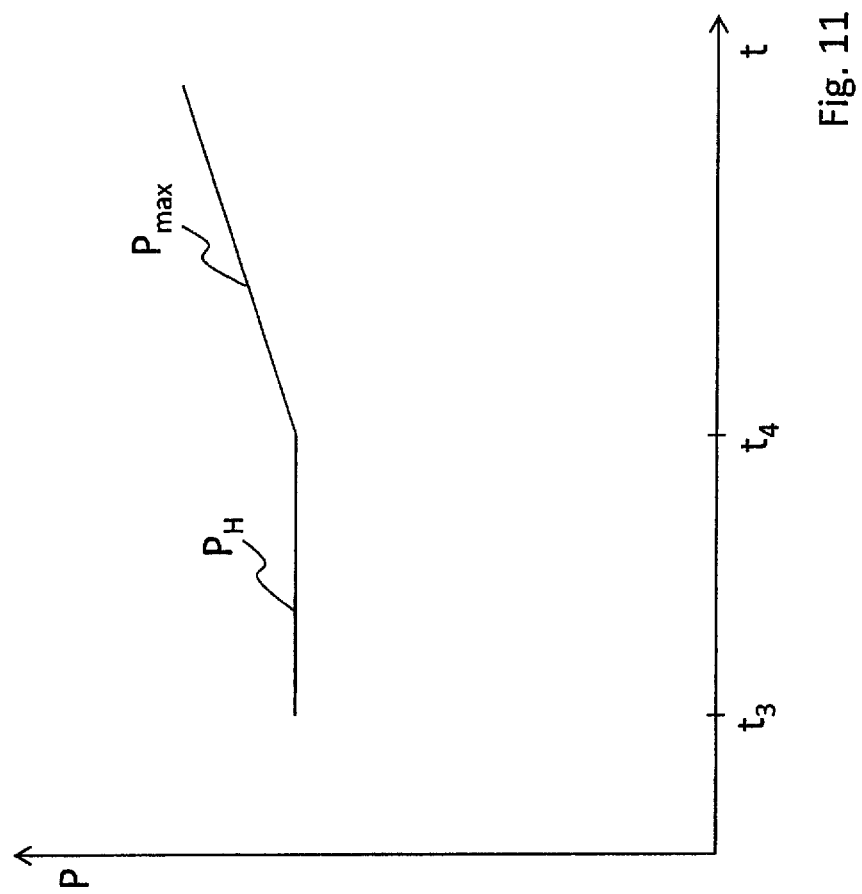
FIG. 11 shows the time profile for the hold setpoint and the maximum permissible power.
Figure 12:
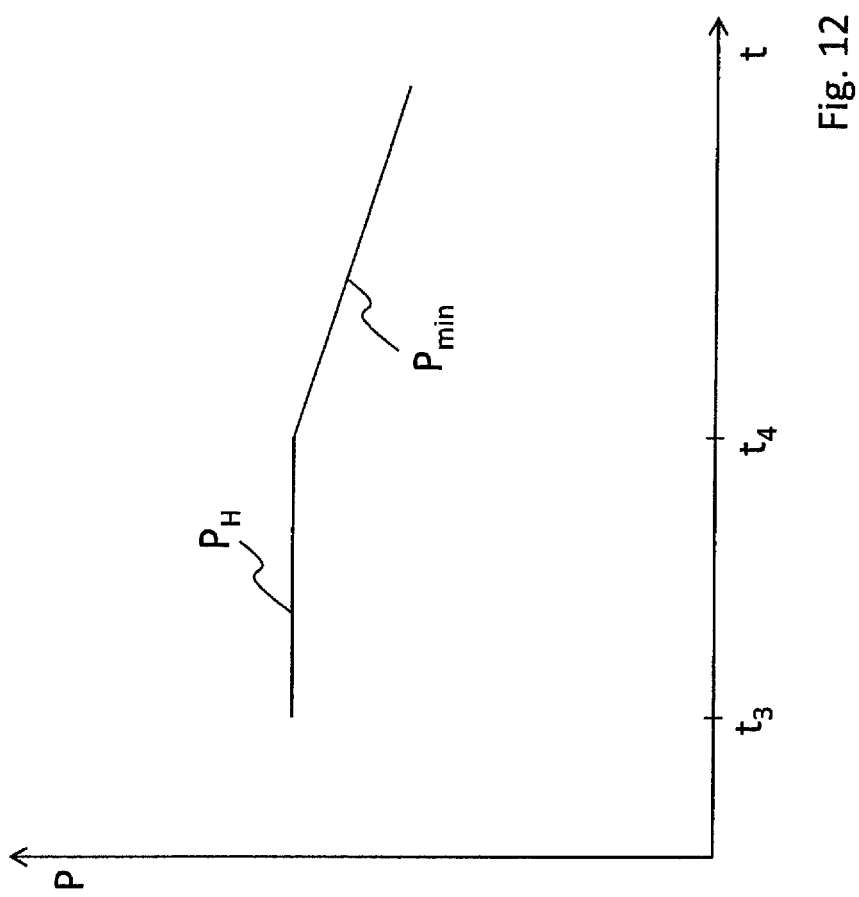
FIG. 12 shows the time profile for the hold setpoint and the minimum permissible power; and, FIG. 13 shows the time profile for the hold setpoint and the minimum and maximum permissible power.
Figure 13:
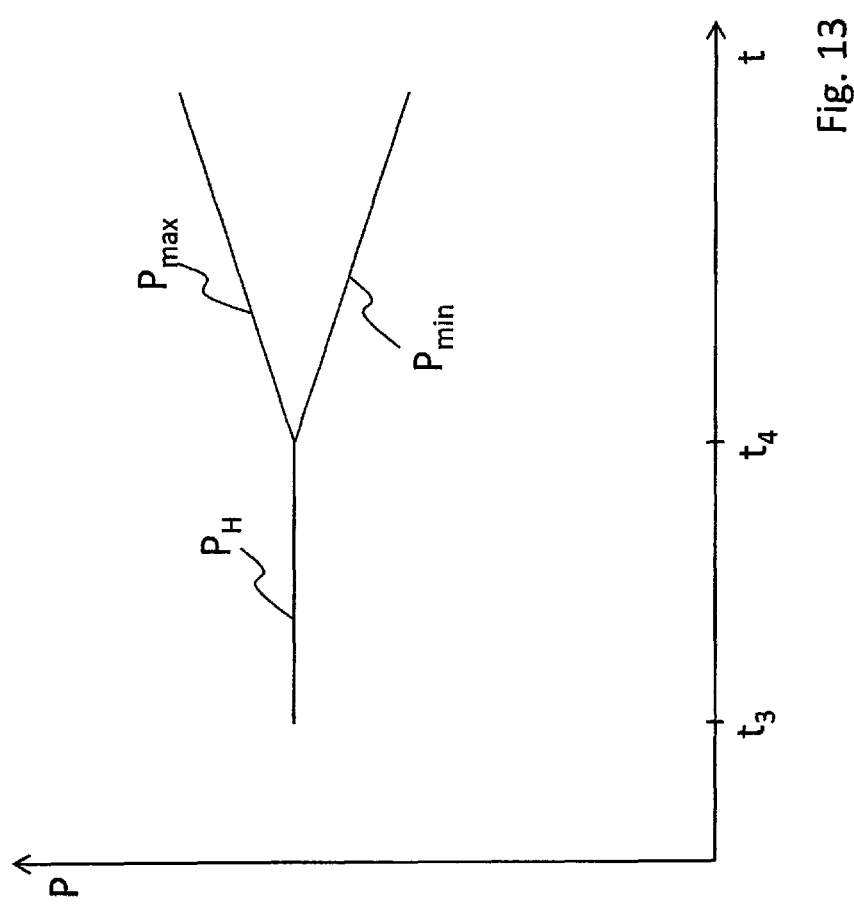

FIGS. 11 to 13 show the procedure of presetting a constant hold setpoint for the power $P_H$ and increasing or decreasing an upper or lower limit for the power $P_{max}$ or $P_{min}$ depending on the time. FIG. 11 illustrates the setpoint for the electrical active power of the generator P over time. In FIG. 11, it is assumed that the grid fault occurs at time $t_3$ and the hold time, in accordance with the invention, begins at $t_3$ and ends at time $t_4$. During the time interval $t_3$, $t_4$, the present setpoint for the electrical active power of the generator is frozen at the value $P_H$. This value corresponds to the present setpoint for the electrical active power of the generator P at time $t_3$. Beginning at time $t_4$, a maximum permissible setpoint is defined and preset, with this setpoint increasing continuously over time.

FIG. 12 shows an alternative embodiment, in which the grid fault occurs at time $t_3$ and the hold time begins at $t_3$ and ends at time $t_4$. During the time interval $t_3$, $t_4$, the present setpoint for the electrical active power is frozen at the value $P_H$. This value corresponds to the present setpoint for the electrical active power of the generator P at time $t_3$. Once the hold time has elapsed, that is, at time $t_4$, a minimum permissible setpoint is defined and preset, with this setpoint decreasing continuously over time.

FIG. 13 shows a corresponding embodiment, in which the grid fault occurs at time $t_3$ and the hold time begins at $t_3$ and ends at time $t_4$. Once the hold time has elapsed at time $t_4$, a minimum permissible setpoint for the electrical active power $P_{min}$ and a maximum permissible setpoint for the electrical active power $P_{max}$ is defined and preset. In the exemplary embodiment illustrated, the minimum permissible setpoint and the maximum permissible setpoint at time $t_4$ have the same value, which in this case corresponds to the value of the hold setpoint of the electrical active power $P_H$. In the time following time $t_4$, the setpoint for the electrical active power should only be within the limits between $P_{min}$ and $P_{max}$. If the setpoint preset depending on rotational speed should be outside these values, it will be limited to these values.

Power limits are used in the examples shown in FIGS. 11 to 13. Alternatively, it is also possible to define torque limits over time instead of a hold setpoint and maximum and minimum permissible setpoints for the power of the generator, wherein these torque limits likewise influence the power of the generator or the wind turbine.

As can be seen from FIG. 6, the operating point 20 after a grid fault with voltage dip needs to be brought back to the characteristic curve 12 by changing the torque and the rotational speed, wherein the operating point of the wind turbine cannot be guided along the characteristic curve 18 in a controlled manner. Corresponding to FIGS. 11 to 13, actual power values which deviate from the hold setpoint for the power $P_H$ to be generated occur after time $t_4$. Therefore, the preset setpoint power is restricted to the values $P_{max}$ or $P_{min}$.

Figure 7:
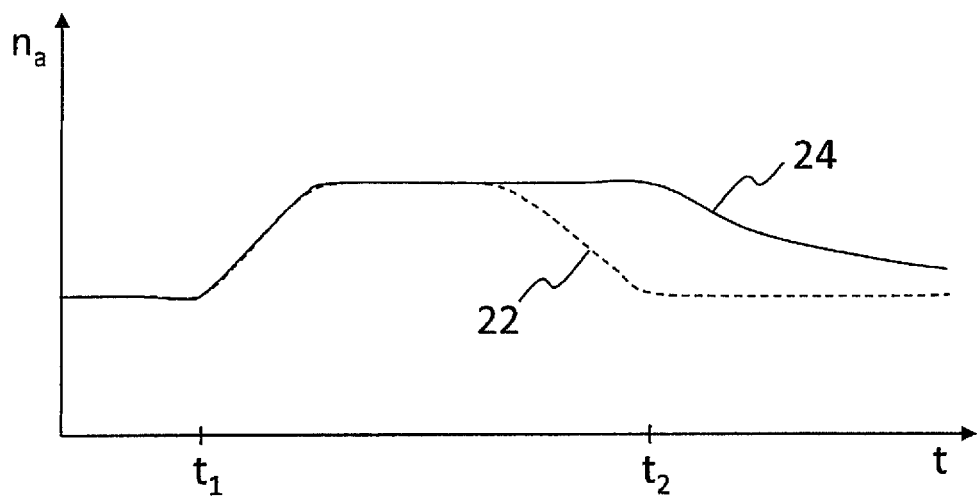
FIG. 7 shows the time profile of the actual value of the rotational speed of the wind turbine during partial-load operation when using the method according to the invention, in comparison with a conventional method.

FIG. 7 shows the actual speed value $n_a$ in the event of the occurrence of a grid fault, during conventional operation of a wind turbine, without any presetting of a hold setpoint for the power $P_H$ to be generated during the grid fault. In this case, the actual speed value follows the line denoted 22. It can clearly be seen that the rotational speed rises at time $t_1$ after the occurrence of a grid fault, drops back down rapidly once the fault event has been cleared and, at time $t_2$ again has the value it had prior to the occurrence of the grid fault. In the method according to the invention, the actual value of the rotational speed likewise increases with the curve 24 once the grid fault has occurred at time $t_1$, but is kept high clearly beyond time $t_2$ since the possible setpoint presets according to the invention are also limited once the grid fault has come to an end.

Figure 8:
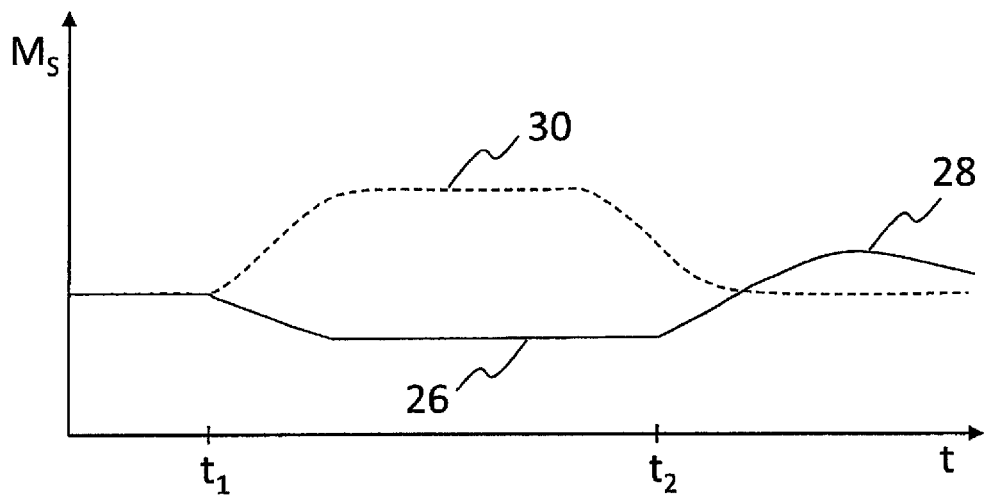
FIG. 8 shows the time profile of the setpoint for the generator torque during partial-load operation when using the method according to the invention, in comparison with a conventional method.

As can be seen from FIG. 8, this means in relation to the setpoint for the generator torque $M_S$ 26 that said setpoint first decreases once the grid fault has occurred, remains reduced during the grid fault and demonstrates a slight overshoot 28 once the grid fault has been cleared. The decrease in the setpoint for the generator torque results from the demand for a constant power to be generated when it is taken into consideration that the actual value for the rotational speed 24 increases once the grid fault has occurred, as can be seen from FIG. 7.

During conventional operation of a wind turbine, in which the power value is not kept constant during the grid fault, the setpoint for the generator torque 30 increases once the grid fault has occurred and decreases again once the grid fault has come to an end.

Figure 9:
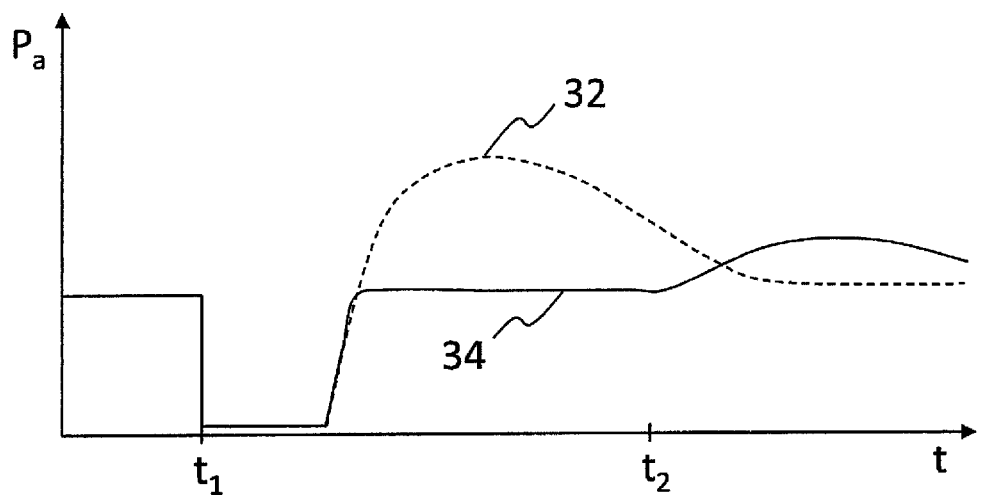
FIG. 9 shows the time profile of the actual value of the power generated during partial-load operation when using the method according to the invention, in comparison with a conventional method.

FIG. 9 shows the actual value for the electrical active power $P_a$ of the wind turbine. Prior to and during the grid fault, both methods necessarily demonstrate the same profile. Only once the grid fault has come to an end does the actual value for the electrical active power 32 increase markedly in the case of a conventional wind turbine. Furthermore, the power stored during the grid fault is outputted quickly to the electrical power supply grid. In the case of the method according to the invention, the profile 34 of the actual value of the electrical active power shows that the stored electrical power is outputted much later and more slowly.

Figure 10:
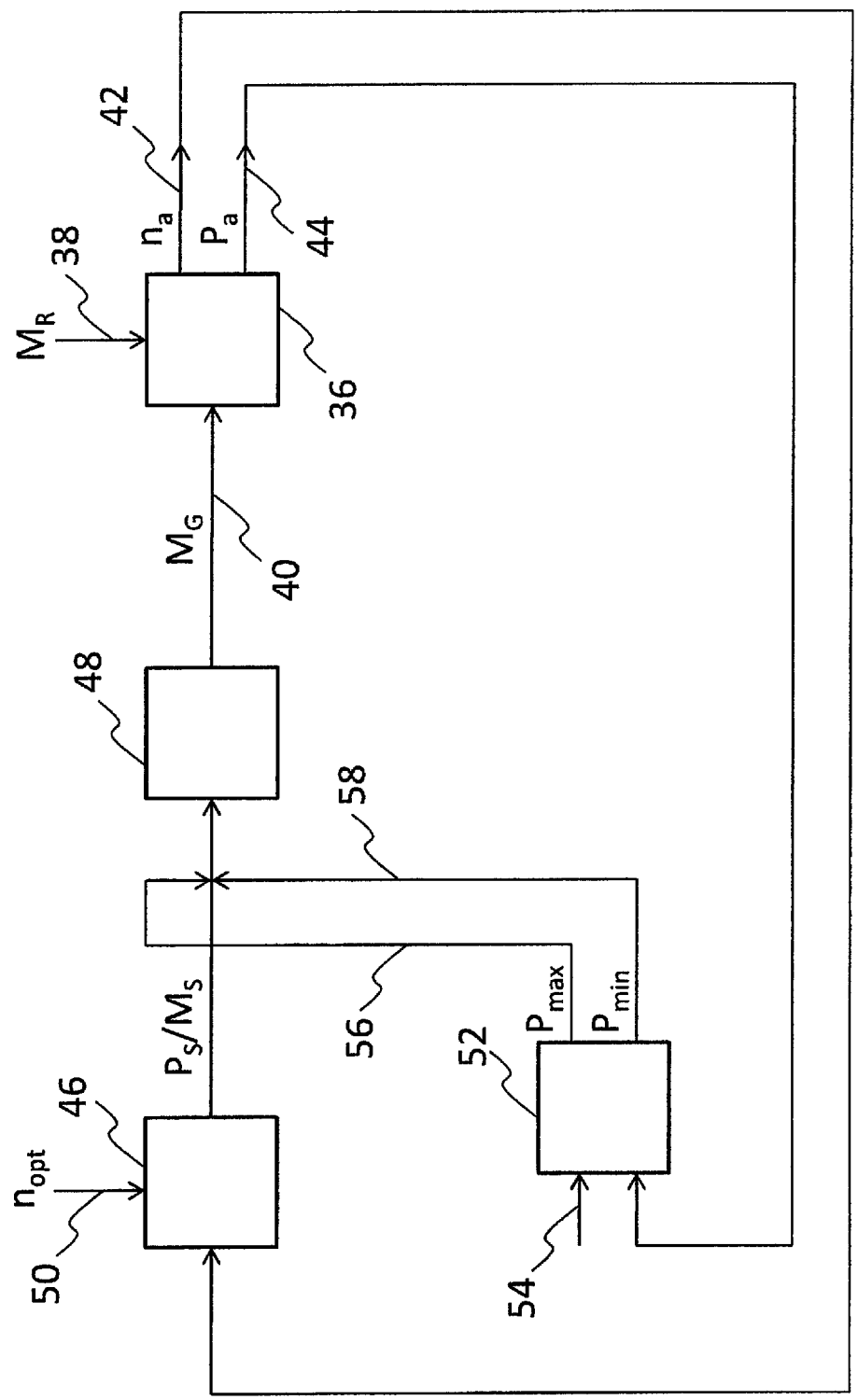
FIG. 10 shows a block diagram illustrating the control of the wind turbine according to the invention.

FIG. 10 shows a function model for the operation of the wind turbine in the event of the occurrence of a grid fault. The generator 36 experiences a rotor torque $M_R$ 38 and a generator torque $M_G$ 40. These two input variables for generating electrical power for the electrical power supply grid are converted by the generator 36 into the speed $n_a$ 42 and an electrical active power $P_a$ 44. The actual value for the rotational speed $n_a$ 42 is present at the controller 46 of the wind turbine, which applies a setpoint for the electrical power $P_S$ or the generator torque $M_S$ to be generated in the converter 48. An optimum rotational speed $n_{opt}$ 50, which corresponds to a rotational speed during nominal load operation, is present at the controller 46 as an additional input variable.

In the invention, a setpoint limitation device 52 is provided, which once the hold time has elapsed, presets a maximum permissible setpoint $P_{max}$ 56 and a minimum permissible setpoint $P_{min}$ 58 for the electrical active power to be generated. The actual value for the electrical active power $P_a$ 44 is present at the setpoint limitation device 52. If the setpoint limitation device 52 identifies, by means of a signal at the input 54 that a grid fault is present, once the hold time has expired, the setpoint preset of the controller 46 is limited to the maximum value or the minimum value of the electrical active power $P_{max}$ or $P_{min}$ and passed correspondingly to the converter 48.

The function model illustrated schematically in FIG. 10 makes it clear that, once the hold time has elapsed, the control of the wind turbine is performed by the controller 46, the converter 48 and the generator 36. The output variable of the controller 46, a setpoint of an electrical power $P_S$ to be generated or a generator torque $M_S$ to be generated, is then also restricted by the setpoint limitation device 52. In this way, the controller 46 operates continuously once the hold time has come to an end and is only limited by the setpoint limitation device 52 in the time in which maximum and/or minimum permissible setpoints are preset. Alternatively, it is also possible for the P/M controller to operate continuously during the hold time, but then its output values are set or corrected to the hold setpoint during the hold time for example by means of the setpoint limitation device.

It is understood that the foregoing description is that of the preferred embodiments of the invention and that various changes and modifications may be made thereto without departing from the spirit and scope of the invention as defined in the appended claims.

What is claimed is:

1. A method for operating a wind turbine when a grid fault with a voltage drop occurs, wherein the wind turbine has a rotor having at least one rotor blade with an adjustable blade pitch angle, a generator connected to the rotor for generating electric power for an electric power supply grid, and a converter connected to the generator and the electric power supply grid, the method comprising the steps of:
   identifying the grid fault;
   detecting a present value of a variable of the wind turbine representing a power;
   presetting a hold setpoint for the variable representing a power of the wind turbine during a hold time, wherein the hold setpoint corresponds to the present value of the variable representing a power when the grid fault arises;
   determining a maximum permissible setpoint for the variable of the wind turbine representing a power, wherein the maximum permissible setpoint is increased with time once the hold time has elapsed;
   driving the wind turbine with a setpoint preset which corresponds to the present rotational speed, wherein the setpoint preset is limited to the maximum permissible setpoint; and,
   ending a preset of the maximum permissible setpoint as soon as the rotational speed-dependent setpoint is less than the maximum permissible setpoint.

2. The method of claim 1 further comprising the steps of:
   determining a minimum permissible setpoint for the variable representing a power of the wind turbine, wherein the minimum permissible setpoint is reduced with time once the hold time has elapsed;
   driving the wind turbine with a setpoint preset which corresponds to the present rotational speed, wherein the setpoint preset is limited to the minimum permissible setpoint; and,
   ending the preset of the minimum permissible setpoint as soon as the rotational speed-dependent setpoint is greater than the minimum permissible setpoint.

3. The method of claim 1, wherein the identifying of the grid fault is achieved in dependence upon at least one of a plurality of variables including: change in a grid voltage ($\Delta U$), change in a grid frequency ($\Delta f$), a fault message from the converter and a fault message from the generator.

4. The method of claim 1, wherein the variable representing the power of the wind turbine corresponds to at least one of a plurality of variables including: an actual value of an electrical power to be generated, a setpoint of an electrical power to be generated, an actual value of a generator torque and a setpoint of a generator torque.

5. The method of claim 1 further comprising the step of controlling a blade pitch angle during the hold time in order to set a rotational speed corresponding to the hold setpoint.

6. The method of claim 2, comprising the further steps of:
   increasing the maximum permissible setpoint at a predetermined first rate of change when a maximum permissible setpoint is present; and,
   reducing the minimum permissible setpoint at a predetermined second rate of change when a minimum permissible setpoint is present.

7. The method of claim 1, comprising the further step of increasing the maximum permissible setpoint at a predetermined first rate of change when a maximum permissible setpoint is present.

8. The method of claim 1, wherein the hold time is ended when the rotational speed falls below a predetermined minimum value for the rotational speed.

9. The method of claim 1, wherein the value of the maximum permissible setpoint corresponds to the value of a minimum permissible setpoint after elapse of the hold time.

10. A method for operating a wind turbine when a grid fault with a voltage drop occurs, wherein the wind turbine has a rotor having at least one rotor blade with an adjustable blade pitch angle, a generator connected to the rotor for generating electric power for an electric power supply grid, and a converter connected to the generator and the electric power supply grid, the method comprising the steps of:
   identifying the grid fault;
   detecting a present value of a variable of the wind turbine representing a power;
   presetting a hold setpoint for the variable representing a power of the wind turbine during a hold time, wherein the hold setpoint corresponds to the present value of the variable representing a power when the grid fault arises;
   determining a minimum permissible setpoint for the variable of a wind turbine representing a power, wherein the minimum permissible setpoint is reduced over time after elapse of the hold time;

driving the wind turbine with a setpoint preset which corresponds to the present rotational speed, wherein the setpoint preset is limited to the minimum permissible setpoint; and, ending the preset of the minimum permissible setpoint as soon as the rotational speed-dependent setpoint is greater than the minimum permissible setpoint.

11. The method of claim 10, wherein the identifying of the grid fault is achieved in dependence upon at least one of a plurality of variables including: change in a grid voltage ($\Delta U$), change in a grid frequency ($\Delta f$), a fault message from the converter and a fault message from the generator.

12. The method of claim 10, wherein the variable of the wind turbine representing a power corresponds to at least one of a plurality of variables including: an actual value of an electrical power to be generated, a setpoint of an electrical power to be generated, an actual value of a generator torque and a setpoint of a generator torque.

13. The method of claim 10 further comprising the step of controlling a blade pitch angle during the hold time in order to set a rotational speed corresponding to the hold setpoint.

14. The method of claim 10, comprising the further step of reducing the minimum permissible setpoint at a predetermined second rate of change when a minimum permissible setpoint is present.

15. The method of claim 10, wherein the hold time is ended when the rotational speed falls below a predetermined minimum value for the rotational speed.

16. The method of claim 10, wherein the value of the maximum permissible setpoint corresponds to the value of a minimum permissible setpoint after elapse of the hold time.

17. A wind turbine comprising:
a rotor blade having an adjustable blade pitch angle;
a generator connected to said rotor and configured to generate electric power for an electric power supply grid;
a converter connected to said generator and the electric supply grid;
a grid fault identification unit configured to identify a grid fault in the electric power supply grid;
a control configured to preset a present value of a variable representing a power as a hold setpoint to at least one of said converter and said generator during a hold time in response to an identified grid fault;
said control also being configured to preset a rotational speed-dependent setpoint after elapse of the hold time; and,
a setpoint limiting unit configured, after elapse of the hold time, to limit the preset setpoint to a maximum permissible setpoint and increase the maximum permissible setpoint over time.

18. The wind turbine of claim 17, wherein said setpoint limiting unit is further configured, after elapse of the hold time, to limit the preset setpoint to a minimum permissible setpoint and reduce the minimum permissible setpoint over time.

19. The wind turbine of claim 17 further comprising a blade pitch control configured to control said blade pitch angle of said rotor blade in response to a grid fault in order to achieve a rotational speed corresponding to said hold setpoint.

20. The wind turbine of claim 17, wherein:
said wind turbine has a nominal power; and,
said setpoint limiting unit is further configured to increase the maximum permissible setpoint over time to one of the nominal power and a predetermined value which is greater than said nominal power of said wind turbine.

21. The wind turbine of claim 17, wherein said grid fault identification unit includes a measuring device connected to the electric power supply grid to detect a change in at least one of a grid voltage and a grid frequency.

22. The wind turbine of claim 17, wherein said grid fault identification unit responds to a fault announcement of at least one of said converter and said generator.

23. A wind turbine comprising:
a rotor blade having an adjustable blade pitch angle;
a generator connected to said rotor and configured to generate electric power for an electric power supply grid;
a converter connected to said generator and the electric supply grid;
a grid fault identification unit configured to identify a grid fault in the electric power supply grid;
a control configured to preset a present value of a variable representing a power as a hold setpoint to at least one of said converter and said generator during a hold time in response to an identified grid fault;
said control also being configured to preset a rotational speed-dependent setpoint after elapse of the hold time; and,
a setpoint limiting unit configured, after elapse of the hold time, to limit the preset setpoint to a minimum permissible setpoint and decrease the minimum permissible setpoint over time.

24. The wind turbine of claim 23 further comprising a blade pitch control configured to control said blade pitch angle of said rotor blade in response to a grid fault in order to achieve a rotational speed corresponding to said hold setpoint.

25. The wind turbine of claim 23, wherein said setpoint limiting unit is configured to reduce the minimum permissible setpoint to zero over time.

26. The wind turbine of claim 23, wherein:
said wind turbine has a nominal power; and,
said setpoint limiting unit is further configured to increase the maximum permissible setpoint over time to one of the nominal power and a predetermined value which is greater than said nominal power of said wind turbine.

27. The wind turbine of claim 23, wherein said grid fault identification unit includes a measuring device connected to the electric power supply grid to detect a change in at least one of a grid voltage and a grid frequency.

28. The wind turbine of claim 23, wherein said grid fault identification unit responds to a fault announcement of at least one of said converter and said generator.

\* \* \* \* \*